(12) United States Patent
Ahn et al.

(10) Patent No.: US 10,142,139 B2
(45) Date of Patent: Nov. 27, 2018

(54) DIGITAL SIGNAL PROCESSOR USING SIGNED MAGNITUDE AND WIRELESS COMMUNICATION RECEIVER HAVING THE SAME

(71) Applicant: Samsung Electronics Co., Ltd., Gyeonggi-do (KR)

(72) Inventors: Seong Woo Ahn, Gyeonggi-do (KR); Hyung Jong Kim, Gyeonggi-do (KR); Hyun Woo Sim, Gyeonggi-do (KR); Hun Kee Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 15/272,994

(22) Filed: Sep. 22, 2016

(65) Prior Publication Data

US 2017/0083479 A1    Mar. 23, 2017

(30) Foreign Application Priority Data

Sep. 22, 2015 (KR) .................. 10-2015-0133476

(51) Int. Cl.
| | |
|---|---|
| *G06F 17/14* | (2006.01) |
| *H04L 27/00* | (2006.01) |
| *G06F 7/00* | (2006.01) |
| *G06F 7/499* | (2006.01) |

(52) U.S. Cl.
CPC ............... *H04L 27/00* (2013.01); *G06F 7/00* (2013.01); *G06F 7/49957* (2013.01)

(58) Field of Classification Search
CPC ......... H04L 27/00; G06F 7/00; G06F 7/49957

USPC ................................................... 708/400–409
See application file for complete search history.

(56) References Cited

U.S. PATENT DOCUMENTS

| | | | | |
|---|---|---|---|---|
| 3,956,623 A | * | 5/1976 | Clark | G06F 1/0353 327/3 |
| 4,700,319 A | * | 10/1987 | Steiner | G06F 7/483 382/303 |
| 8,639,738 B2 | | 1/2014 | Liao et al. | |
| 8,713,085 B1 | | 4/2014 | Yeo | |
| 8,819,515 B2 | | 8/2014 | Chen et al. | |
| 2006/0013316 A1 | | 1/2006 | Fandrianto et al. | |
| 2008/0159441 A1 | * | 7/2008 | Liao | G06F 7/523 375/324 |
| 2009/0240855 A1 | * | 9/2009 | Guri | G06F 17/5045 710/105 |

(Continued)

FOREIGN PATENT DOCUMENTS

| | | |
|---|---|---|
| KR | 2003-0078033 | 10/2003 |
| KR | 10-2007-0018981 | 2/2007 |

*Primary Examiner* — Tan V. Mai
(74) *Attorney, Agent, or Firm* — The Farrell Law Firm, P.C.

(57) ABSTRACT

A digital signal processor is provided. The digital signal processor includes an execution circuit configured to receive a first data including first bits expressed in a signed magnitude method and a second data including second bits expressed in the signed magnitude method, and a control logic circuit configured to output a control signal that determines a type of operation on the first data and the second data based on a command signal, wherein the execution circuit is further configured to perform an operation on the first data and the second data according to a determined type of operation and generate a result of the operation.

14 Claims, 12 Drawing Sheets

(56) References Cited

U.S. PATENT DOCUMENTS

2010/0002572 A1\* 1/2010 Garrett ................. H04L 27/265
370/210

\* cited by examiner

FIG. 9A

| CASE | SIGN(X) | SIGN(Y) | CONDITION | MODE (SIGN(X)^SIGN(Y)) | CARRY (MAG(X)<MAG(Y)) &&MODE | OPERATION RESULT | |
|---|---|---|---|---|---|---|---|
| | | | | | | MAG(Z) | SIGN(Z) |
| 1 | 0 | 0 | MAG(X)<MAG(Y) | 0 | 0 | MAG(X)+MAG(Y) | 0 |
| 2 | | | MAG(X)≥MAG(Y) | 0 | 0 | MAG(X)+MAG(Y) | 0 |
| 3 | | 1 | MAG(X)<MAG(Y) | 0 | 0 | MAG(X)+MAG(Y) | 1 |
| 4 | | | MAG(X)≥MAG(Y) | 0 | 0 | MAG(X)+MAG(Y) | 1 |
| 5 | 0 | 1 | MAG(X)<MAG(Y) | 1 | 1 | ~(MAG(X)−MAG(Y)−CARRY) | 1 |
| 6 | | | MAG(X)≥MAG(Y) | 1 | 0 | MAG(X)−MAG(Y) | 0 |
| 7 | 1 | 0 | MAG(X)<MAG(Y) | 1 | 1 | ~(MAG(X)−MAG(Y)−CARRY) | 0 |
| 8 | | | MAG(X)≥MAG(Y) | 1 | 0 | MAG(X)−MAG(Y) | 1 |

FIG. 9B

| CASE | SIGN(X) | SIGN(Y) | CONDITION | MODE (SIGN(X)^SIGN(Y)) | CARRY (MAG(X)<MAG(Y)) &&MODE | OPERATION RESULT MAG(Z) | SIGN(Z) |
|---|---|---|---|---|---|---|---|
| 1 | 0 | 0 | MAG(X)<MAG(Y) | 0 | 1 | ~(MAG(X)−MAG(Y)−CARRY) | 1 |
| 2 | 0 | 0 | MAG(X)≥MAG(Y) | 0 | 0 | MAG(X)−MAG(Y) | 0 |
| 3 | 1 | 1 | MAG(X)<MAG(Y) | 0 | 1 | ~(MAG(X)−MAG(Y)−CARRY) | 0 |
| 4 | 1 | 1 | MAG(X)≥MAG(Y) | 0 | 0 | MAG(X)−MAG(Y) | 1 |
| 5 | 0 | 1 | MAG(X)<MAG(Y) | 1 | 0 | MAG(X)+MAG(Y) | 0 |
| 6 | 0 | 1 | MAG(X)≥MAG(Y) | 1 | 0 | MAG(X)+MAG(Y) | 0 |
| 7 | 1 | 0 | MAG(X)<MAG(Y) | 1 | 0 | MAG(X)+MAG(Y) | 1 |
| 8 | 1 | 0 | MAG(X)≥MAG(Y) | 1 | 0 | MAG(X)+MAG(Y) | 1 |

DIGITAL SIGNAL PROCESSOR USING SIGNED MAGNITUDE AND WIRELESS COMMUNICATION RECEIVER HAVING THE SAME

PRIORITY

This application claims priority under 35 U.S.C. § 119(a) to a Korean Patent Application filed on Sep. 22, 2015 in the Korean Intellectual Property Office and assigned Serial No. 10-2015-0133476, the entire contents of which are incorporated herein by reference.

BACKGROUND

1. Field of the Disclosure

The present disclosure relates generally to a digital signal processor, and more particularly, to a digital signal processor using a signed magnitude method and a mobile receiver having the same.

2. Description of the Related Art

An attempt has been made to embody a portion or all of a baseband modem in a digital signal processor (DSP) on account of a size of an integrated circuit or chip used in a mobile communication field and flexibility in specification change or a reduction in a development period of a chip.

Methods of expressing fixed point binary data in a DSP include a two's (2's) complement method, a one's (1's) complement method, or a signed magnitude method. The 2's complement method is adopted in order to embody an efficient adder in other fields in addition to a mobile communication field.

However, since most input and output data used in a mobile communication algorithm characteristically form a Gaussian distribution centered about zero, the input/output data frequently transit from a positive number to a negative number or from a negative number to a positive number. As a result, power loss in a baseband modem is generated due to toggling of a sign bit(s) of the input/output data.

SUMMARY

An aspect of the present disclosure provides a digital signal processor. The digital signal processor includes an execution circuit configured to receive a first operand including first bits expressed by a signed magnitude method and a second operand including second bits expressed in the signed magnitude method, and a control logic circuit configured to output a control signal that determines a type of operation on the first operand and the second operand based on a command signal, wherein the execution circuit is further configured to perform an operation on the first operand and the second operand according to a determined type of operation and generate a result of the operation.

Another aspect of the present disclosure provides a digital signal processor that further includes a fast Fourier transform (FFT) circuit which generates each of the first data and the second data by performing a FFT on each of first data and second data, and an IFFT circuit which receives a result of the operation.

Another aspect of the present disclosure provides a digital signal processor that further includes an inverse fast Fourier transform (IFFT) circuit which generates each of the first data and the second data by performing an IFFT on each of first data and second data transmitted from the execution circuit.

Another aspect of the present disclosure provides an execution circuit that includes a first operator which perform an operation in the signed magnitude method, and a second operator which performs an operation in a 2's complement method, where the first operator includes an arithmetic logic unit (ALU) which performs an addition or subtraction operation, and a multiplier which performs a multiplication operation.

Another aspect of the present disclosure provides an ALU that includes a mode determination logic circuit which receives a sign bit of the first data and a sign bit of the second data, and determines a mode value according to the control signal, and a carry determination logic circuit which performs an AND logic operation on a comparison value obtained by comparing a magnitude bit of the first data and a magnitude bit of the second data and the mode value.

Another aspect of the present disclosure provides an ALU that further includes an intermediate arithmetic circuit which varies a calculation method of an intermediate value according to the mode value and a magnitude value output logic circuit which varies a calculation method of magnitude bits of output data according to whether or not the intermediate value is a negative number.

Another aspect of the present disclosure provides a multiplier that includes a sign value output logic circuit which receives a sign bit of the first data and a sign bit of the second data, and perform an XOR logic operation on the sign bit of the first data and the sign bit of the second data to generate a sign value, and a multiplication arithmetic circuit which receives a magnitude bit of the first data and a magnitude bit of the second data to perform a multiplication operation thereon.

Another aspect of the present disclosure provides a control logic circuit that includes a fetch circuit which fetches the command signal, and a decode circuit which decodes the command signal loaded from a program memory and outputs a control signal for determining a type of the operation according to a result of the decoding.

According to an aspect of the present disclosure, a wireless communication device is provided. The wireless communication device includes a receiver configured to receive a radio frequency analog signal, an analog-to-digital converter (ADC) configured to perform an analog-to-digital conversion on the received radio frequency analog signal, a digital signal processor configured to perform an operation on a converted digital signal, and a decoder configured to decode the operated digital signal, wherein the digital signal processor includes an execution circuit configured to receive a first operand including first bits expressed in a signed magnitude method and a second operand including second bits expressed in the signed magnitude method, and a control logic circuit configured to determine a type of operation on the first operand and the second operand based on a command signal, wherein the execution circuit is further configured to perform an operation on the first operand and the second operand according to a type of a determined operation and generate a result of the operation.

Another aspect of the present disclosure provides a digital signal processor that further includes an FFT circuit which performs an FFT on each of first data and second data to generate each of the first data and the second data, and an IFFT which receives a result of the operation.

Another aspect of the present disclosure provides a digital signal processor that further includes an IFFT circuit which performs an IFFT on each of first data and second data transmitted from the execution circuit to generate each of the first data and the second data, and an FFT circuit which receives a result of the operation.

Another aspect of the present disclosure provides an execution circuit that includes a first operator which performs an operation in the signed magnitude method and a second operator which performs an operation in a 2's complement method, in which the first operator includes an ALU which performs an addition or subtraction operation and a multiplier which perform a multiplication operation.

Another aspect of the present disclosure provides an ALU that includes a mode determination logic circuit which receives a sign bit of the first data and a sign bit of the second data and determines a mode value according to the control signal, and a carry determination logic circuit which performs an AND logic operation on a comparison value obtained by comparing a magnitude bit of the first data and a magnitude bit of the second data and the mode value.

Another aspect of the present disclosure provides an ALU that further includes an intermediate arithmetic circuit which varies a calculation method of an intermediate value according to the mode value, and a magnitude value output logic circuit which varies a calculation method of magnitude bits of output data according to whether or not the intermediate value is a negative number.

Another aspect of the present disclosure provides a control logic circuit that includes a fetch circuit which fetches the command signal and a decode circuit which decodes the command signal and outputs a control signal for determining a type of the operation according to a result of the decoding.

According to an aspect of the present disclosure, a method of a digital signal processor is provided. The method includes receiving, by an execution circuit, a first operand including first bits expressed in a signed magnitude method and a second operand including second bits expressed in the signed magnitude method; outputting, by a control logic circuit, a control signal that determines a type of operation on the first operand and the second operand based on a command signal; and performing, by the execution circuit, an operation on the first operand and the second operand according to a determined type of operation and generate a result of the operation.

BRIEF DESCRIPTION OF THE DRAWINGS

The above and other aspects, features, and advantages of the present disclosure will be more apparent from the following description, taken in conjunction with the accompanying drawings, of which:

FIG. 9A is a table of output data according to conditions of a first value and a second value when performing an addition operation in the ALU of FIG. 6;

FIG. 9B is a table of output data according to conditions of a first value and a second value when performing a subtraction operation in the ALU of FIG. 6;

DETAILED DESCRIPTION OF EMBODIMENTS OF THE PRESENT DISCLOSURE

Figure 1:
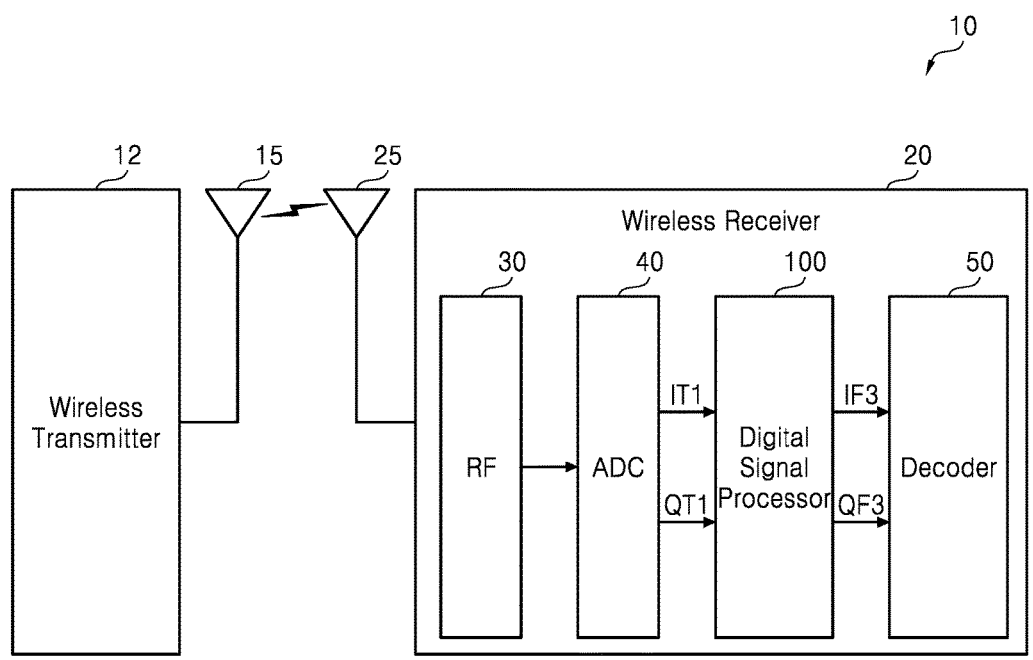
FIG. 1 is a block diagram of a wireless communication system according to an embodiment of the present disclosure.

Reference will now be made in detail to the embodiments of the present disclosure, examples of which are illustrated in the accompanying drawings, wherein like reference numerals refer to like elements throughout. The embodiments are described below in order to explain the present disclosure by referring to the accompanying drawings.

FIG. 1 is a block diagram of a wireless communication system according to an embodiment of the present disclosure.

Referring to FIG. 1, a wireless communication system 10 may include a wireless communication transmitter 12 and a wireless communication receiver 20.

Each of the wireless communication transmitter 12 and the wireless communication receiver 20 may be a mobile phone, a smart phone, a mobile internet device (MID), an Internet of Things (IoT) device, an Internet of Everything (IoE) device, or a wearable computer; however, it is not limited thereto.

For example, each of the wireless communication transmitter 12 and the wireless communication receiver 20 may transmit or receive a wireless signal through a wireless communication network. The wireless communication network may include wireless local area network (WLAN) such as wireless fidelity (WiFi), a wireless personal area network (WPAN) such as Bluetooth, a wireless universal serial bus (USB), a Zigbee, near field communication (NFC), radio-frequency identification (RFID), or a mobile cellular network; however, it is not limited thereto. For example, the mobile communication network may include a $3^{rd}$ generation (3G) mobile communication network, a $4^{th}$ generation (4G) mobile communication network, a long term evolution (LTE™) mobile communication network, or an LTE-Advanced (LTE-A) mobile communication network; however, it is not limited thereto.

The wireless communication transmitter 12 may transmit a wireless signal (for example, an analog signal or a digital signal) using a transmission antenna 15. The wireless communication receiver 20 may include a receiving antenna 25, a wireless receiver 30, an ADC 40, a DSP 100, and a decoder 50.

The wireless communication transmitter 12 and the wireless communication receiver 20 may perform communication in an orthogonal frequency division multiplexing (OFDM) method defined in the Institute of Electrical and Electronics Engineers (IEEE) standard 802.16d or an orthogonal frequency division multiple access (OFDMA) method defined in IEEE standard 802.16e; however, it is not limited thereto.

The wireless receiver 30 may receive a wireless signal transmitted from the wireless communication transmitter 12 using the receiving antenna 25.

The ADC 40 may convert a wireless signal (for example, an analog signal) output from the wireless receiver 30 into a digital signal. The ADC 40 may transmit the digital signal to the DSP 100. The digital signal may be a signal in the time-domain. The digital signal may be represented as a complex number, and may include a first data IT1 indicating a real number and a second data QT1 indicating an imaginary number.

According to an embodiment of the present disclosure, the ADC 40 may output data on one complex number which includes the first data IT1 and the second data QT1.

The digital signal processor 100 may receive the first data IT1 and the second data QT1 and perform an operation on the first data IT1 and the second data QT1. The DSP 100 may output a result value(s) of an operation to the decoder 50. The operation may include addition, subtraction, and/or multiplication.

The DSP 100 may perform channel estimation or de-noising. According to an embodiment of the present disclosure, the DSP 100 may perform demodulation.

The decoder 50 may receive a result value of an operation output from the DSP 100, and correct an error by decoding the result value. The result value may be represented as a complex number, and may include a third data IF3 which is a real number and a fourth data QF3 which is an imaginary number. Each of the third data IF3 and the fourth data QF3 may be data in the frequency domain.

Figure 2:
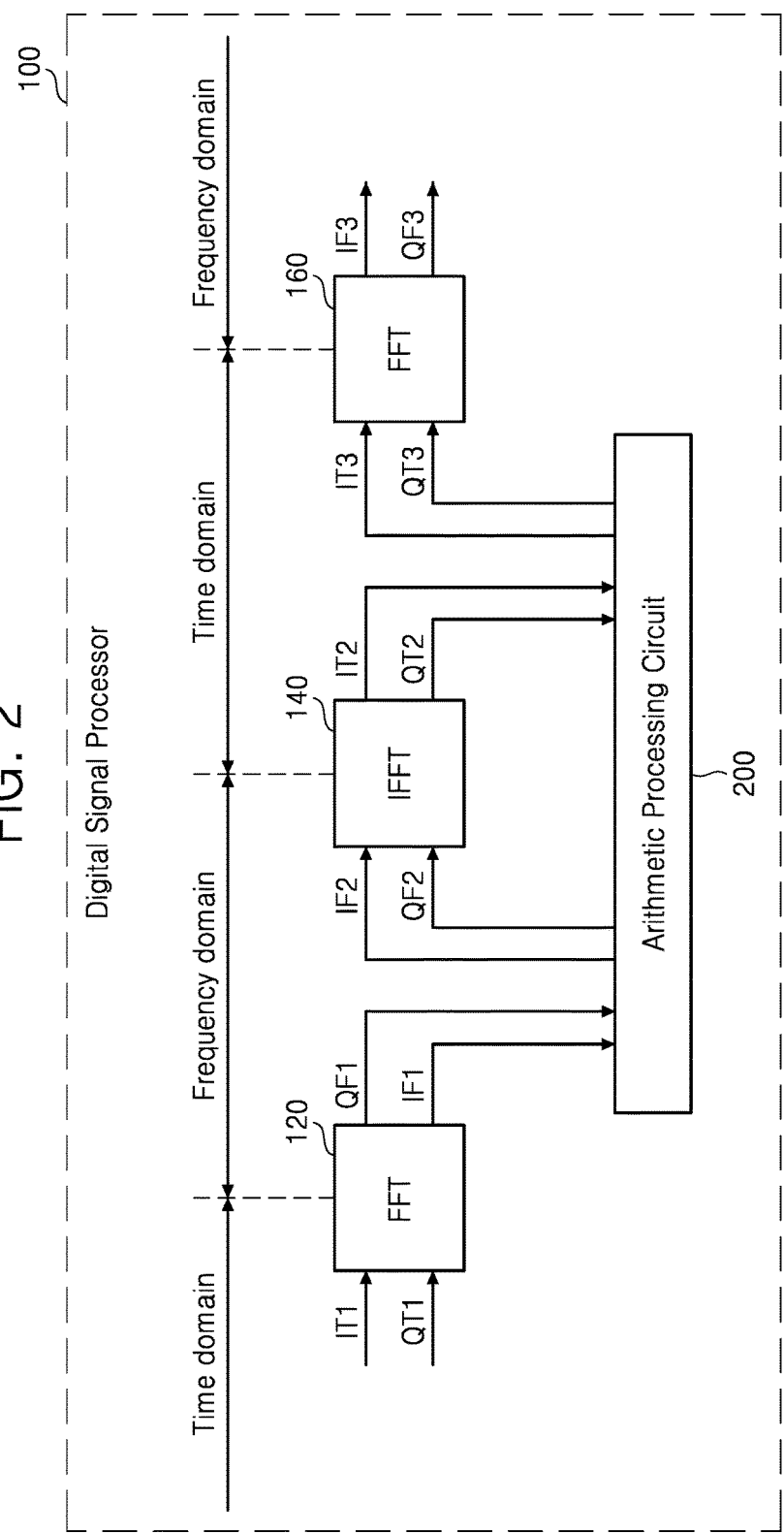
FIG. 2 is a block diagram of a digital signal processor of FIG. 1.

FIG. 2 is a block diagram of the DSP 100 of FIG. 1.

Referring to FIGS. 1 and 2, the DSP 100 may include an FFT circuit 120, an IFFT circuit 140, a second FFT circuit 160, and an arithmetic processing circuit 200.

The first FFT circuit 120 may receive the first data IT1 and the second data QT1 output from the ADC 40, and perform an FFT for transforming each of the first data IT1 and the second data QT1 into data in the frequency domain. According to an embodiment of the present disclosure, the first FFT circuit 120 may perform a discrete Fourier transform (DFT) instead of an FFT.

The first FFT circuit 120 may output a fifth data IF1 and a sixth data QF1 to the arithmetic processing circuit 200 as a result of the transformation. Each of the fifth data IF1 and the sixth data QF1 may be data in the frequency domain. The fifth data IF1 may be a real number of a complex number and the sixth data QF1 may be an imaginary number of the complex number.

Even if it is shown that the fifth data IF1 and the sixth data QF1 are separately transmitted as in FIGS. 1 and 2; however, the first FFT circuit 120 may output complex data including the fifth data IF1 and the sixth data QF1.

The arithmetic processing circuit 200 may receive the fifth data IF1 and the sixth data QF1 output from the first FFT circuit 120, perform an operation (for example, addition, subtraction, or multiplication) on these data (IF1 and QF1), and output a seventh data IF2 and an eighth data QF2 corresponding to a result of the operation to the IFFT circuit 140. Even if it is shown that the seventh data IF2 and the eighth data QF2 are separately transmitted as in FIGS. 1 and 2; however, the arithmetic processing circuit 200 may output complex data including the seventh data IF2 and the eighth data QF2 to the IFFT circuit 140.

Each of the seventh data IF2 and the eighth data QF2 may be data in the frequency domain. The seventh data IF2 may be a real number of a complex number and the eighth data QF2 may be an imaginary number of the complex number.

The arithmetic processing circuit 200 may receive a ninth data IT2 and a tenth data QT2 output from the IFFT circuit 140, perform an operation (for example, addition, subtraction, or multiplication) on the ninth data IT2 and the tenth data QT2, and output an eleventh data IT3 and a twelfth data QT3 to the second FFT circuit 160 as a result of the operation.

According to an embodiment of the present disclosure, the arithmetic processing circuit 200 may output complex data including the eleventh data IT3 and the twelfth data QT3 to the second FFT circuit 160.

Each of the eleventh data IT3 and the twelfth data QT3 may be data in the frequency domain. The eleventh data IT3 may be a real number of a complex number, and the twelfth data QT3 may be an imaginary number of the complex number.

The IFFT circuit 140 may receive the seventh data IF2 and the eighth data QF2 output from the arithmetic processing circuit 200, and perform IFFT on these data (IF2 and QF2).

According to an embodiment of the present disclosure, the IFFT circuit 140 may perform an inverse discrete Fourier transform (IDFT) instead of an IFFT. The IFFT circuit 140 may output the ninth data IT2 and the tenth data QT2 to the arithmetic processing circuit 200 as a result of the transformation.

Each of the ninth data IT2 and the tenth data QT2 may be data in the time domain. The ninth data IT2 may be a real number of a complex number, and the tenth data QT2 may be an imaginary number of the complex number. According to an embodiment of the present disclosure, the IFFT circuit 140 may output complex data including the ninth data IT2 and the tenth data QT2.

The second FFT circuit 160 may receive the eleventh data IT3 and the twelfth data QT3 output from the arithmetic processing circuit 200, and perform FFT of transforming each of the eleventh data IT3 and the twelfth data QT3 into the frequency domain. According to an embodiment of the present disclosure, the second FFT circuit 160 may perform a DFT instead of an FFT.

The second FFT circuit 160 may output the third data IF3 and the fourth data QF3 to the decoder 50 as a result of the transformation. Each of the third data IF3 and the fourth data QF3 may be data in the frequency domain. The third data IF3 may be a real number of a complex number, and the fourth data QF3 may be an imaginary number of the complex number. According to an embodiment of the present disclosure, the second FFT circuit 160 may output complex data including the third data IF3 and the fourth data QF3.

Each of the first FFT circuit 120 and the second FFT circuit 160 is embodied to be a separate circuit in FIG. 2; however, the first FFT circuit 120 and the second FFT circuit 160 may be embodied in an FFT circuit which performs an FFT.

Figure 3:
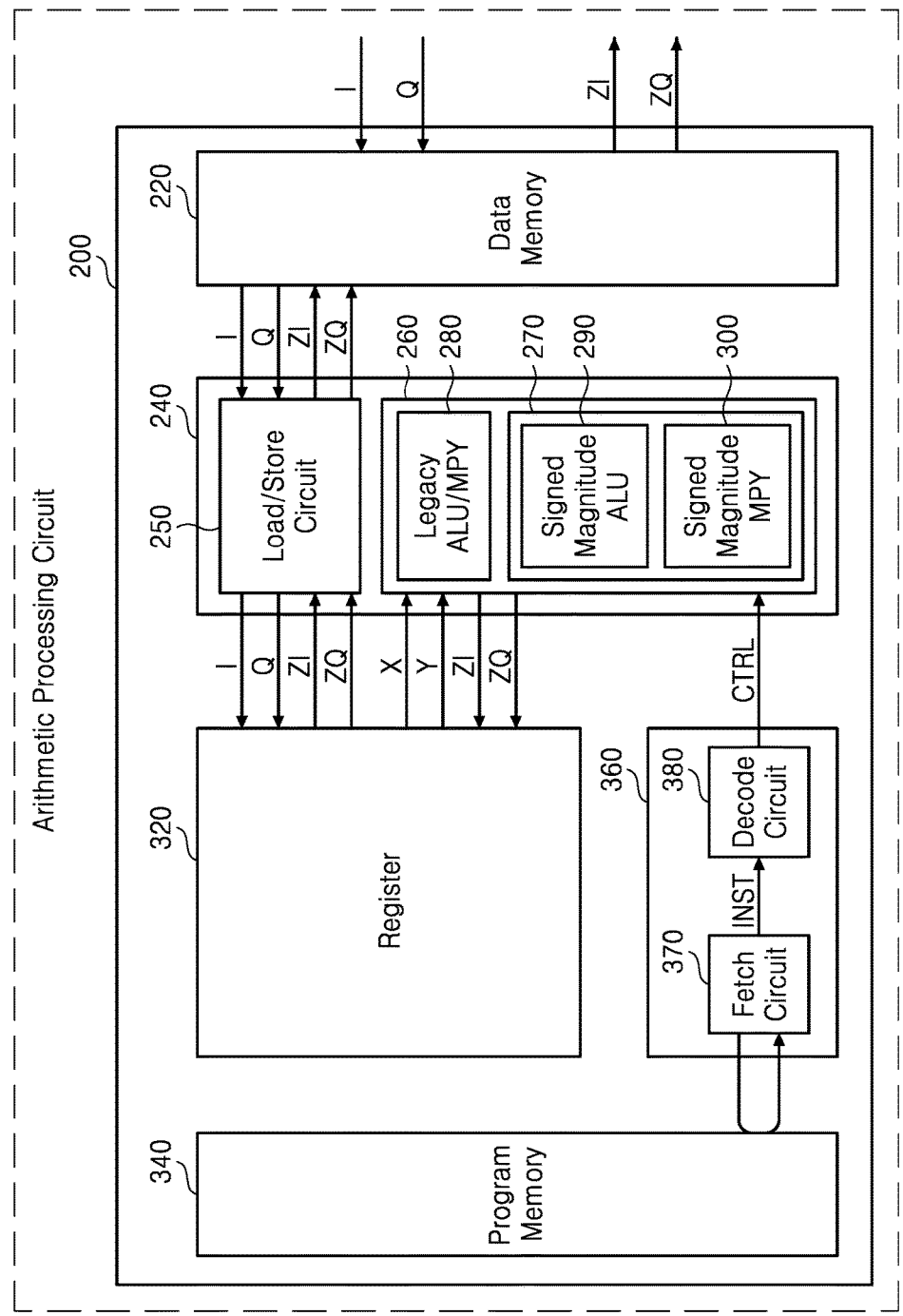
FIG. 3 is a block diagram of an arithmetic processing circuit of FIG. 2.
Figure 4A:
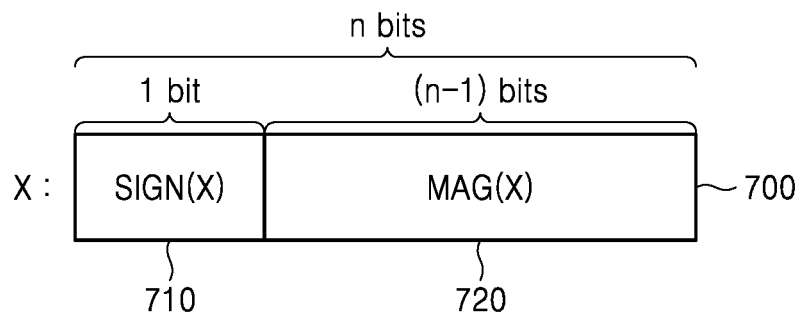
FIGS. 4A-4C are illustrations of bit configurations of a first data, a second data, and output data, respectively, of FIG. 3.
Figure 4B:
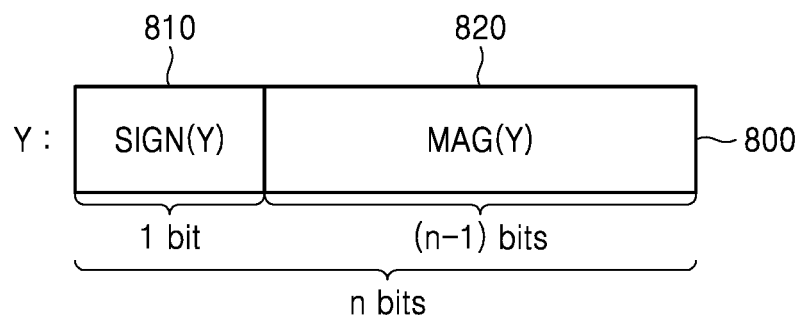
Figure 4C:
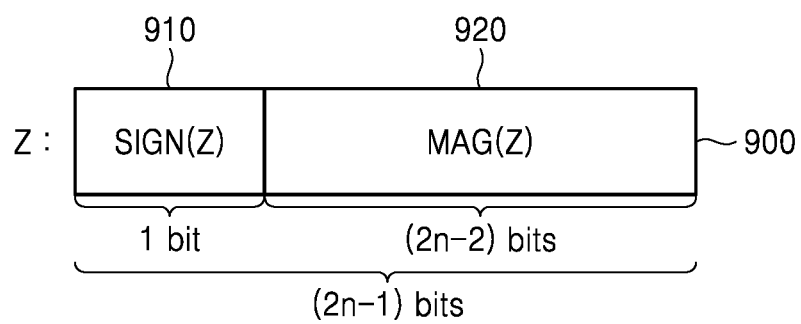
Figure 5:
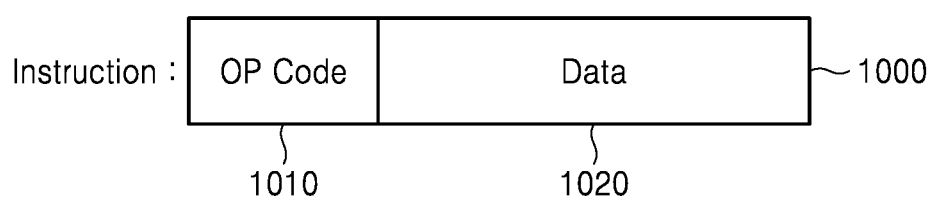
FIG. 5 is an illustration of a bit configuration of a command signal of FIG. 3.

FIG. 3 is a block diagram of the arithmetic processing circuit 200 of FIG. 2, FIGS. 4A-4C are illustrations of bit configurations of a first operand, a second operand, and output data of FIG. 3, and FIG. 5 is an illustration of a bit configuration of a command signal of FIG. 3. The bit configuration may include a plurality of bits.

Referring to FIG. 3, the arithmetic processing circuit 200 may include a data memory 220, an execution circuit 240, a register 320, a program memory 340, and a control logic circuit 360.

The data memory 220 may receive and store a first operand I and a second operand Q, and receive and store a first output data ZI and a second output data ZQ from the execution circuit 240.

The first operand I may be one of the fifth data IF1 and the sixth data QF1, and the second operand Q may be one of the ninth data IT2 and the tenth data QT2.

The first operand I represents a real number of a complex number, and the second operand Q represents an imaginary number of the complex number. Accordingly, when the first operand I is the fifth data IF1, the second operand I needs to be the sixth data QF1, and when the first operand I is the ninth data IT2, the second operand Q surely needs to be the tenth data QT2.

The first output data ZI may be one of the seventh data IF2 and the eleventh data IT3, and the second output data ZQ may be one of the eighth data QF2 and the twelfth data QT3.

The first output data ZI represents a real number of a complex number, and the second output data ZQ represents an imaginary number of the complex number. Accordingly, when the first output data ZI is the seventh data IF2, the second output data ZQ needs to be the eighth data QF2, and when the first output data ZI is the eleventh data IT3, the second output data ZQ surely needs to be the twelfth data QT3.

Referring to FIGS. 4A-4C, the first output data ZI and the second output data ZQ may be collectively represented as output data Z for convenience of description.

The output data Z may include a sign bit SIGN(Z) 910 and a magnitude bit MAG(Z) 920. The sign bit 910 of the output data Z may be k bits (for example, k is a natural number, for example, k may be one). Accordingly, when the output data Z is (2n−1) bits, the magnitude bit 920 of the output data Z may be (2n−2) bits, where n may be a natural number greater than or equal to two.

Bits included in the output data Z may be expressed in a signed magnitude method.

The data memory 220 of the arithmetic processing circuit 200 may receive and store a plurality of first operands and a plurality of second operands (in a sequential manner) for an arithmetic operation.

The execution circuit 240 may include a load/storage circuit 250 and an arithmetic circuit 260. The load/storage circuit 250 may load first operands to be subjected to an operation among the plurality of first operands and second operands to be subjected to an operation among the plurality of second operands from the data memory 220 and store loaded data.

The arithmetic circuit 260 may include a first operator 270 and a second operator 280. The arithmetic circuit 260 may determine one of the operators 270 and 280 to be used in an operation according to a control signal CTRL, and determine a type of operation.

The arithmetic circuit 260 may receive a first value X and a second value Y from the register 320, and perform an operation on these values (X and Y). The arithmetic circuit 260 may transmit the first output data ZI and the second output data ZQ generated as a result of the operation to the register 320.

For convenience of description, each data transmitted to the execution circuit 240 to perform an operation on the first operands and the second operands may be represented as the first value X and the second value Y.

The first value X may include a sign bit SIGN(X) 710 and a magnitude bit MAG(X) 720. The sign bit 710 of the first value X may be one bit. Accordingly, when the first value X is n bits, the magnitude bit 720 of the first value X may be (n−1) bits.

A second value Y may include a sign bit SIGN(Y) 810 and a magnitude bit MAG(Y) 820. The sign bit 810 of the second value Y may be one bit. Accordingly, when the second value Y is n bits, the magnitude 820 of the second value Y may be (n 1)-bits. The number of bits in the first value X may be equal to the number of bits in the second value Y.

Bits included in the first value X and bits included in the second value Y may be expressed in a signed magnitude method.

The first operator 270 may include an ALU 290 and a multiplier 300. The ALU 290 may perform an addition operation or a subtraction operation using a signed magnitude method according to a control signal CTRL. The multiplier 300 may perform a multiplication operation using the signed magnitude method according to the control signal CTRL.

The second operator 280 may perform an addition, subtraction, or multiplication operation using a 2's complement method.

The register 320 may load and store first operands and second operands to be subjected to operations from the load/storage circuit 250. The register 320 may transmit each data to be subjected to operations to the execution circuit 240.

According to a type of operation, the first value X and the second value Y may be changed. For example, when the type of operation is addition or subtraction, each of the first value X and the second value Y may be a real number or an imaginary number, respectively.

In addition, when the type of operation is multiplication, according to an operation procedure of a complex number, the second value Y may be a real number or an imaginary number when the first value X is a real number, and the second value Y may be a real number or an imaginary number when the first value X is an imaginary number.

The program memory 340 may store command signals and software fetched by the control logic circuit 360.

The control logic circuit 360 may include a fetch circuit 370 and a decode circuit 380. The fetch circuit 370 may fetch a command signal indicating a type of operation among the command signals stored in the program memory 340. The fetch circuit 370 may transmit a fetched command signal INST to the decode circuit 380.

Referring to FIG. 5, a command signal INST may include a plurality of bits. The command signal INST may include operation code (OP code) bits 1010 and data bits 1020. The OP code bits 1010 may include information on a type of operation to be performed by the execution circuit 240.

The decode circuit 380 may receive the command signal INST from the fetch circuit 380, decode the command signal INST, and transmit a control signal to the arithmetic circuit 260 according to a result of the decoding. The control signal CTRL may be a signal which determines a type of operation to be performed by the arithmetic circuit 260.

Figure 6:
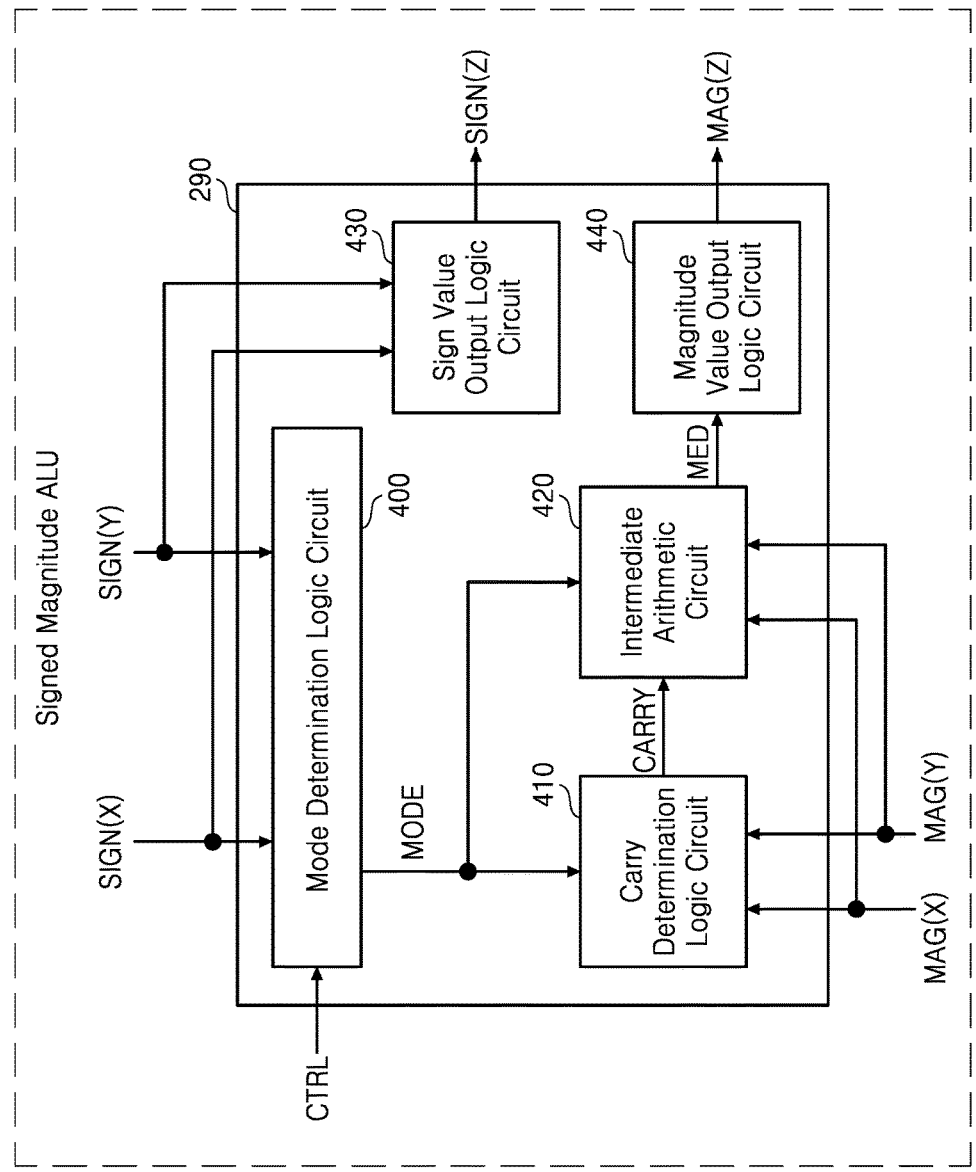
FIG. 6 is a block diagram of an ALU in a signed magnitude method of FIG. 3.

FIG. 6 is a block diagram of the ALU 290 in a signed magnitude method of FIG. 3.

Referring to FIG. 6, the ALU 290 may include a mode determination logic circuit 400, a carry determination logic circuit 410, an intermediate arithmetic circuit 420, a sign value output logic circuit 430, and a magnitude value output logic circuit 440.

The ALU 290 may receive the first value X and the second value Y from the register 320, and perform addition or subtraction on the first value X and the second value Y using the signed magnitude method.

The mode determination logic circuit 400 may receive the sign bit 710 of the first value X and the sign bit 810 of the second value Y, and determine a mode value MODE according to the control signal CTRL. The mode value determination formula may be different according to the control signal CTRL, which determines whether a type of operation is addition or subtraction.

The carry determination logic circuit 410 may receive the magnitude bits 720 of the first value X, the magnitude bits 820 of the second value Y, and a mode value MODE, perform logic operation on these values 720, 820, and MODE, and determine a carry value corresponding to a result of the logic operation.

The intermediate arithmetic circuit 420 receives the magnitude bits 720 of the first value X, the magnitude bits 820 of the second value Y, the carry value CARRY, and the mode value MODE, and a method of determining an intermediate value MED according to a mode value MODE is described below with reference to steps S140, S150A, and S150B of FIG. 7.

The sign value output logic circuit 430 may receive the sign bit 710 of the first value X and the sign bit 810 of the second value Y, perform an XOR operation on the sign bit 710 of the first value X and the sign bit 810 of the second value Y, and determine a sign bit 910 of output data Z corresponding to a result of the operation.

The magnitude value output logic circuit 440 may receive the intermediate value MED, and determine magnitude bits 920 of the output data Z according to the intermediate value MED. A method of calculating the magnitude bits 920 of the output data Z is described below with reference to steps S160, S170A, and S170B of FIG. 7.

Figure 7:
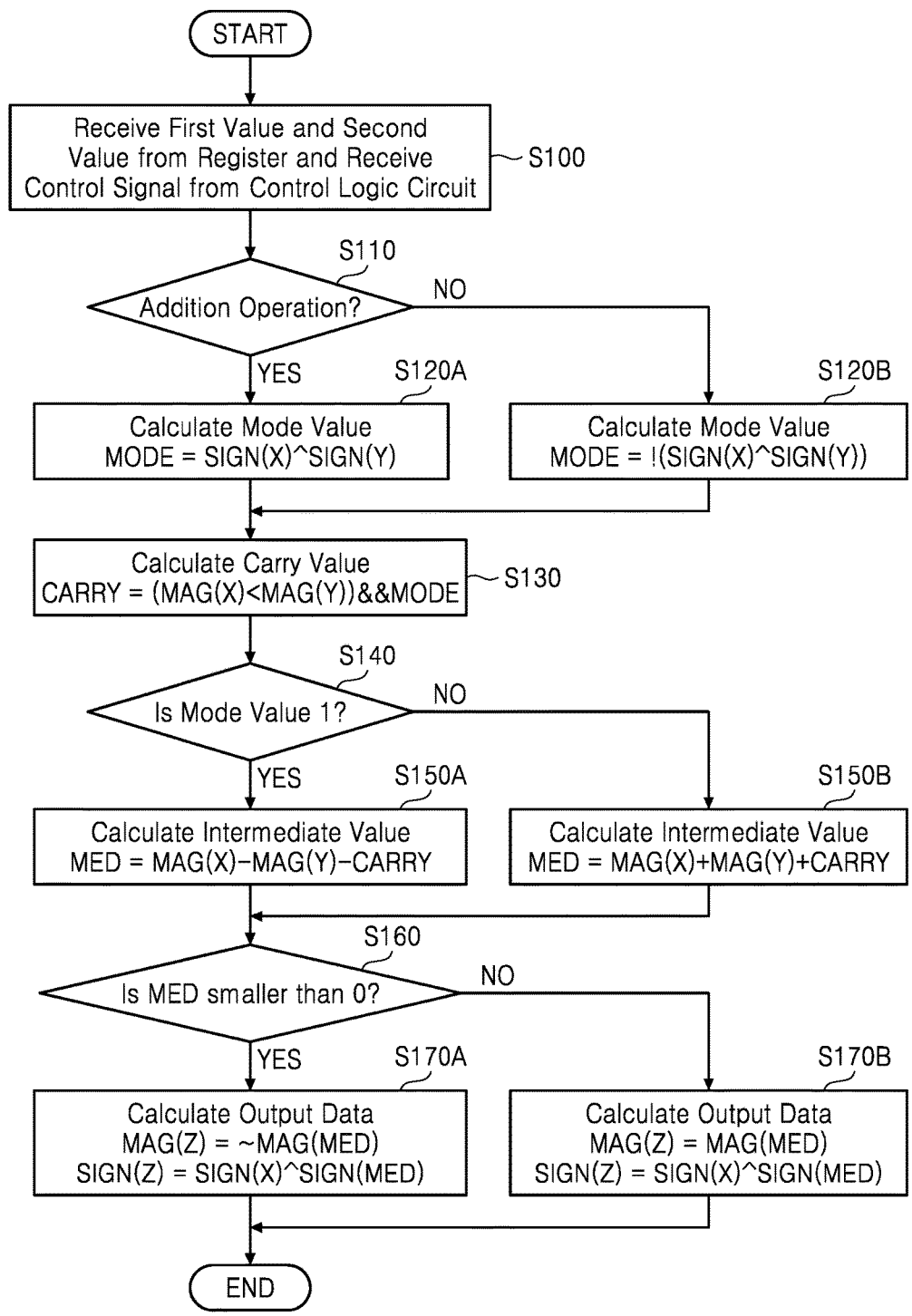
FIG. 7 is a flowchart of a method of the ALU in the signed magnitude method of FIG. 6.
Figure 8:
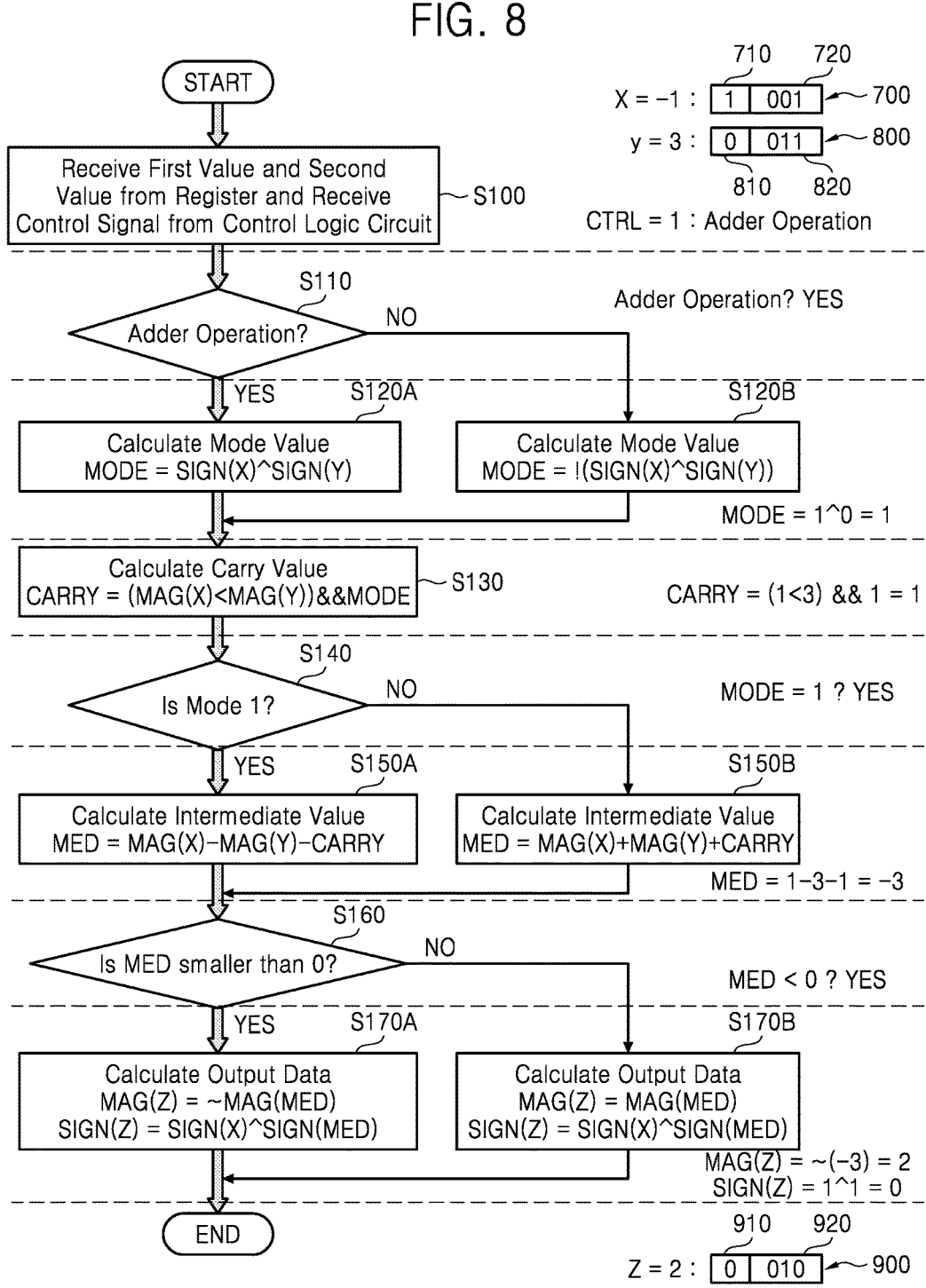
FIG. 8 is a flow chart of a method of the ALU in the signed magnitude method of FIG. 6.

FIG. 7 is a flowchart of a method of the ALU 290 in the signed magnitude method shown in FIG. 6, and FIG. 8 is a flow chart of a method of the ALU 290 in the signed magnitude method shown in FIG. 6.

Referring to FIGS. 7 and 8, the ALU 290 may receive the first value X and the second value Y from the register 320, and receive the control signal CTRL from the control logic circuit 360 in step S100.

For example, the first value X may be a decimal number "−1" and the second value Y may be a decimal number "3," where a value of a sign bit is one when the first value X or the second value Y is a negative number, and the value of the sign bit is zero when the first value X or the second value Y is a positive number.

As shown in FIG. 8, since in the example a sign of the first value X is negative, a value of the sign bit 710 may represent one and magnitude bits 720 of the first value X may represent 3b001. The first value X may be represented as 4b1001. Since a sign of the second value Y is positive, a value of the sign bit 810 may represent zero, and magnitude bits 820 of the second value Y represents 3b011. The second value Y may be represented as 4b0011.

The ALU 290 may determine a type of operation according to the control signal CTRL. The operation may be addition or subtraction.

For example, addition is instructed when the control signal CTRL has a value of one, subtraction is instructed when the control signal has a value of two, and multiplication is instructed when the control signal has a value of three, since a value of the control signal CTRL is one as shown in FIG. 8, the ALU 270 may perform addition.

When the control signal CTRL instructs addition, for example, when a value of the control signal CTRL is one, a mode value MODE may be determined according to Equation (1) as follows in step S120A.

$$MODE=SIGN(X){\wedge}SIGN(Y) \qquad \text{Equation (1)}$$

The symbol "^" in Equation (1) may represent an XOR logic operator. Moreover, SIGN(X) may represent a sign bit of the first value X, SIGN(Y) may represent a sign bit of the second value Y, and MODE may represent a mode value. The sign bit SIGN(X) may represent a value of a sign bit and the sign bit SIGN(Y) may represent a value of a sign bit.

For example, when the sign bit SIGN(X) of the first value X is equal to the sign bit SIGN(Y) of the second value, the mode value MODE may be zero, and when the sign bit SIGN(X) of the first value X is not equal to the sign bit SIGN(Y) of the second value, the mode value MODE may be one.

When the control signal CTRL instructs subtraction, for example, when a value of the control signal CTRL is two, the mode value MODE may be determined according to Equation (2) as follows in step S120B.

$$MODE=!(SIGN(X){\wedge}SIGN(Y)) \qquad \text{Equation (2)}$$

The symbol "!" in Equation (2) may represent a NOT logic operator. For example, when a value obtained by performing an XOR logic operation on the sign bit SIGN(X) of the first value X and the sign bit SIGN(Y) of the second value is zero (for example, false), the mode value MODE may be one (for example, true), and when a value obtained by performing an XOR logic operation on the sign bit SIGN(X) of the first value X and the sign bit SIGN(Y) of the second value is one (for example, true), the mode value MODE may be zero (for example, false).

In the example shown in FIG. 8, since a value of the control signal CTRL is one in the example, the mode value MODE may be calculated according to Equation (1) above. Since the sign bit SIGN(X) of the first value X is one and the sign bit SIGN(Y) of the second value is zero in the example, the mode value MODE may be determined to be one according to Equation (1) above (e.g., MODE=1^0).

The carry value CARRY may be calculated by performing an AND operation on a comparison value obtained by comparing magnitude bits MAG(X) of the first value X with magnitude bits MAG(Y) of the second value Y and the mode value MODE in step S130. The carry value CARRY may be calculated according to Equation (3) as follows.

$$CARRY=(MAG(X)<MAG(Y))\&\&MODE \qquad \text{Equation (3)}$$

CARRY in Equation (3) above may represent a carry value, MAG(X) may represent magnitude bits of the first value X, and MAG(Y) may represent magnitude bits of the second value (Y). Moreover, the symbol "<" may represent an operator for magnitude comparison, and the symbol "&&" may represent an AND operator.

Accordingly, in Equation (3) above, the magnitude bits MAG(X) of the first value X are smaller than the magnitude bits MAG(Y) of the second value Y, (MAG(X)<MAG(Y)) may represent one as true, and when the magnitude bits MAG(X) of the first value X are greater than or equal to the magnitude bits MAG(Y) of the second value Y, (MAG(X)<MAG(Y)) may represent zero as false.

Moreover, when both a logic value of (MAG(X)<MAG(Y)) and a mode value MODE are one, a carry value CARRY may be one, and otherwise, the carry value CARRY may be zero.

In the example shown in FIG. 8, since the magnitude bits MAG(X) of the first value X is 001 and the magnitude bits MAG(Y) of the second value Y is 011, (MAG(X)<MAG(Y)) may represent one as true. Since the mode value MODE in Equation (1) above is one, the carry value CARRY may be one. CARRY=(MAG(X)<MAG(Y))&&MODE= 1&&1=1.

According to a mode value MODE, a method of calculating an intermediate value MED may be changed in step S140. When the mode value MODE is one, the intermediate value MED may be calculated according to Equation (4) as follows in step S150A.

$$MED=MAG(X)-MAG(Y)-CARRY \qquad \text{Equation (4)}$$

MED in Equation (4) above represents an intermediate value. When the mode value MODE is not one, the intermediate value MED may be determined according to Equation (5) as follows in step S150B.

$$MED=MAG(X)+MAG(Y)+CARRY \qquad \text{Equation (5)}$$

In the example shown in FIG. 8, since MED=1−3−1=−3, the intermediate value MED may be −3.

According to whether or not the intermediate value MED is a negative number, a method of calculating the output data Z may be changed in step S160.

When the intermediate value MED is a negative number, output data Z may be determined according to Equation (6) as follows in step S170A.

$$MAG(Z)=\sim MAG(MED)$$

$$SIGN(Z)=SIGN(X)^\wedge SIGN(MED) \qquad \text{Equation (6)}$$

MAG(Z) in Equation (6) above represents magnitude bits of output data, MAG(MED) represents magnitude bits of an intermediate value MED, SIGN(Z) represents a sign bit of output data, and SIGN(MED) represents a sign bit of an intermediate value MED.

In addition, the symbol "∼" may represent an inversion. When an intermediate value MED is a negative number, magnitude bits of output data Z may be inversely transformed values of magnitude bits of the intermediate value.

The inverse transformation indicates an inverse operation using a 2's complement. While the inversion operation is performed, bits of the first value X and bits of the second value Y may be expressed in a 2's complement method.

When an intermediate value MED is greater than or equal to zero, output data may be determined according to Equation (7) as follows in step S170B.

$$MAG(Z)=MAG(MED)$$

$$SIGN(Z)=SIGN(X)^\wedge SIGN(MED) \qquad \text{Equation (7)}$$

In the example shown in FIG. 8, an intermediate value MED is a negative number −3. Therefore, according to the 2's complement method, magnitude bits of the output data Z may be MAG(Z)=∼MAG(−3)=∼(1101)=0010, where 0010 is a binary number. A sign bit of the output data Z may be SIGN(Z)=1^1=0. Accordingly, the output data Z may be 0010.

FIG. 9A is a table of output data according to conditions of a first value and a second value when performing an addition operation in the ALU 290 of FIG. 6, and FIG. 9B is a table of output data according to conditions of a first value and a second value when performing a subtraction operation in the ALU 290 of FIG. 6.

Referring to FIGS. 9A and 9B, a mode value MODE, a carry value CARRY, and a sign bit SIGN(Z) and magnitude bits MAG(Z) of output data Z according to conditions of a sign bit SIGN(X) and magnitude bits MAG(X) of a first value X and a sign bit SIGN(Y) and magnitude bits MAG(Y) of a second value Y are shown.

Referring to FIGS. 8 and 9A, since the sign bit 710 of the first value X is one, the sign bit 810 of the second value Y is zero, a value of the magnitude bits 720 of the first value X is less than a value of the magnitude bits 820 of the second value Y, a result such as CASE 7 in FIG. 9A may be obtained D1, which is the same as in FIG. 8.

Figure 10:
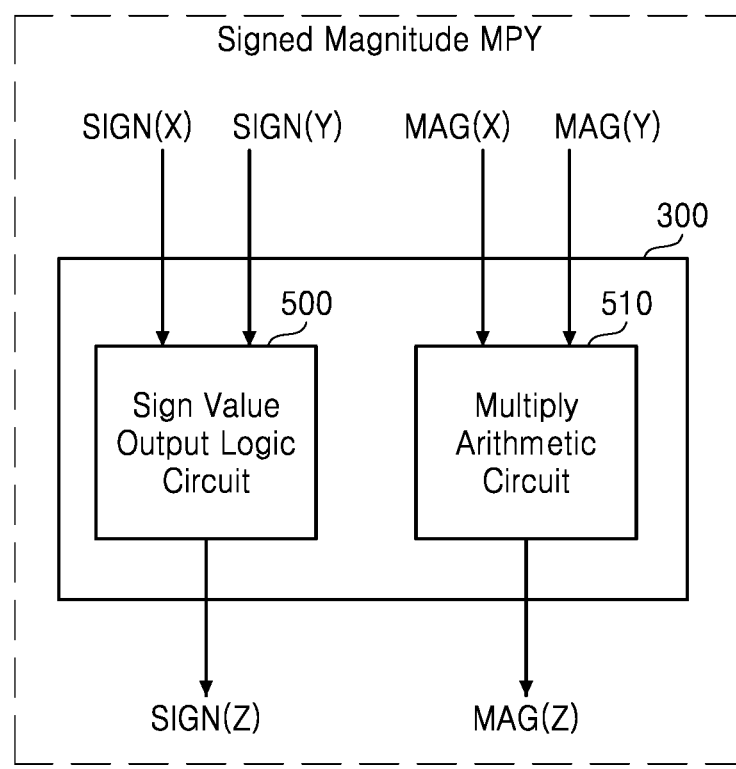
FIG. 10 is a block diagram of a multiplier in a signed magnitude method of FIG. 3.

FIG. 10 is a block diagram of a multiplier 300 in the signed magnitude method shown of FIG. 3.

Referring to FIG. 10, the multiplier 300 may include a sign value output logic circuit 500 and a multiply arithmetic circuit 510.

The sign value output logic circuit 500 may receive a sign bit SIGN(X) of a first value X and a sign bit SIGN(Y) of a second value Y, and perform a logic operation on the sign bit SIGN(X) of the first value X and the sign bit SIGN(Y) of the second value Y to determine a sign bit SIGN(Z) of output data Z.

The multiply arithmetic circuit 510 may receive magnitude bits MAG(X) of the first value X and magnitude bits MAG(Y) of the second value Y, perform a multiplication operation on these magnitude bits MAG(X) and MAG(Y) to determine magnitude bits (Z) of the output data Z.

Figure 11:
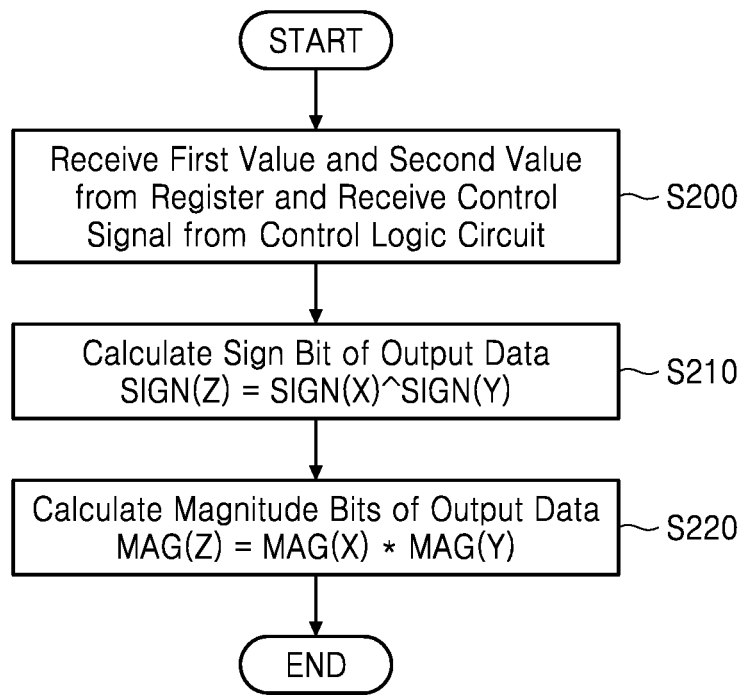
FIG. 11 is a flowchart of a method of the multiplier of FIG. 10.

FIG. 11 is a flowchart of a method of the multiplier 300 of FIG. 10.

Referring to FIG. 11, the multiplier 300 may receive the first value X and the second value Y from the register 320 in FIG. 3, and receive a control signal CTRL from the control logic circuit 360 of FIG. 3 in step S200 of FIG. 11.

When the control signal CTRL instructs a multiplication operation, the sign value output logic circuit 500 in FIG. 10 may receive a sign bit SIGN(X) of the first value X and a sign bit SIGN(Y) of the second value Y, perform an XOR operation on these sign bits SIGN(X) and SIGN(Y), and determine a sign bit SIGN(Z) of the output data Z according to a result of the performance as represented by Equation (8) as follows.

$$SIGN(Z)=SIGN(X)^\wedge SIGN(Y) \qquad \text{Equation (8)}$$

The multiply arithmetic circuit 510 may receive the magnitude bits MAG(X) of the first value X and magnitude bits MAG(Y) of the second value Y, perform a multiplication operation on these magnitude bits MAG(X) and MAG(Y) to determine magnitude bits Z of the output data Z according to a result of the performance in step S220. The magnitude bits MAG(Z) of the output data Z may be determined according to Equation (9) as follows.

$$MAG(Z)=MAG(X)*MAG(Y) \qquad \text{Equation (9)}$$

A digital signal processor including an arithmetic processing device using a signed magnitude method according to an embodiment of the present disclosure may reduce power loss caused by toggling of a sign bit(s) of data expressed in the signed magnitude method.

Although certain embodiments of the present disclosure have been shown and described, it will be appreciated by those skilled in the art that changes may be made in these embodiments without departing from the scope of the present disclosure, which is defined in the appended claims and their equivalents.

What is claimed is:

1. A digital signal processor, comprising:
an execution circuit configured to receive a first operand including first bits expressed in a signed magnitude method and a second operand including second bits expressed in the signed magnitude method,
a control logic circuit configured to output a control signal that determines a type of operation on the first operand and the second operand based on a command signal,
wherein the execution circuit is further configured to perform an operation on the first operand and the second operand according to a determined type of operation and generate a result of the operation, a fast Fourier transform (FFT) circuit or an inverse FFT (IFFT) configured to perform an FFT or an IFFT on each of first data and second data to generate each of the first operand and the second operand; and an IFFT circuit or an FFT circuit configured to receive the result of the operation.

2. The digital signal processor of claim 1, wherein the execution circuit comprises:

a first operator configured to perform an operation in the signed magnitude method; and a second operator configured to perform an operation in a two's (2's) complement method, wherein the first operator comprises:

an arithmetic logic unit (ALU) configured to perform an addition or a subtraction operation, and a multiplier configured to perform a multiplication operation.

3. The digital signal processor of claim 2, wherein the ALU comprises:

a mode determination logic circuit configured to receive a sign bit of the first operand and a sign bit of the second operand, and to determine a mode value according to the control signal, and a carry determination logic circuit configured to perform an AND logic operation on a comparison value obtained by comparing a magnitude bit of the first operand and a magnitude bit of the second operand and the mode value.

4. The digital signal processor of claim 3, wherein the ALU further comprises:

an intermediate arithmetic circuit configured to vary a calculation method of an intermediate value according to the mode value, and a magnitude value output logic circuit configured to vary a calculation method of magnitude bits of output data according to whether or not the intermediate value is a negative number.

5. The digital signal processor of claim 2, wherein the multiplier comprises:

a sign value output logic circuit configured to receive a sign bit of the first operand and a sign bit of the second operand, and to perform an XOR logic operation on the sign bit of the first operand and the sign bit of the second operand to generate a sign value, and a multiply arithmetic circuit configured to receive a magnitude bit of the first operand and a magnitude bit of the second operand to perform a multiplication operation.

6. The digital signal processor of claim 1, wherein the control logic circuit comprises:

a fetch circuit configured to fetch the command signal, and a decode circuit configured to decode the command signal loaded from a program memory and to output a control signal for determining a type of the operation according to a result of the decoding.

7. A wireless communication device, comprising:

a receiver configured to receive a radio frequency analog signal;

an analog-to-digital converter (ADC) configured to perform an analog-to-digital conversion on the received radio frequency analog signal;

a digital signal processor configured to perform an operation on a converted digital signal, and a decoder configured to decode the operated digital signal, wherein the digital signal processor comprises:

an execution circuit configured to receive a first operand including first bits expressed in a signed magnitude method and a second operand including second bits expressed in the signed magnitude method, a control logic circuit configured to determine a type of operation on the first operand and the second operand based on a command signal, wherein the execution circuit is further configured to perform an operation on the first operand and the second operand according to a type of a determined operation and generate a result of the operation, a fast Fourier transform (FFT) circuit or an inverse FFT (IFFT) configured to perform an FFT or an IFFT on each of first data and second data to generate each of the first operand and the second operand; and an IFFT circuit or an FFT circuit configured to receive the result of the operation.

8. The wireless communication device of claim 7, wherein the execution circuit comprises:

a first operator configured to perform an operation in the signed magnitude method, and a second operator configured to perform an operation in a two's (2's) complement method, wherein the first operator comprises:

an arithmetic logic unit (ALU) configured to perform an addition or a subtraction operation, and a multiplier configured to perform a multiplication operation.

9. The wireless communication device of claim 8, wherein the ALU comprises:

a mode determination logic circuit configured to receive a sign bit of the first operand and a sign bit of the second operand, and to determine a mode value according to the control signal, and a carry determination logic circuit configured to perform an AND logic operation on a comparison value obtained by comparing a magnitude bit of the first operand and a magnitude bit of the second operand and the mode value.

10. The wireless communication device of claim 9, wherein the ALU further comprises:

an intermediate arithmetic circuit configured to vary a calculation method of an intermediate value according to the mode value, and a magnitude value output logic circuit configured to vary a calculation method of magnitude bits of output data according to whether or not the intermediate value is a negative number.

11. The wireless communication device of claim 7, wherein the control logic circuit comprises:

a fetch circuit configured to fetch the command signal, and a decode circuit configured to decode the loaded command signal and output a control signal for determining a type of the operation according to a result of the decoding.

12. A method of a digital signal processor, comprising:

receiving, by an execution circuit, a first operand including first bits expressed in a signed magnitude method and a second operand including second bits expressed in the signed magnitude method;

outputting, by a control logic circuit, a control signal that determines a type of operation on the first operand and the second operand based on a command signal;

performing, by the execution circuit, an operation on the first operand and the second operand according to a determined type of operation and generate a result of the operation;

performing, by a fast Fourier transform (FFT) circuit or an inverse FFT (IFFT), an FFT or an IFFT on each of first data and second data to generate each of the first operand and the second operand; and receiving, by an IFFT circuit or an FFT, the result of the operation.

13. The method of claim 12, further comprising:

receiving, by a receiver, a radio frequency analog signal;

performing, by an analog-to-digital converter (ADC), an analog-to-digital conversion on the received radio frequency analog signal;

performing, by a digital signal processor, an operation on a converted digital signal, and decoding, by a decoder, the operated digital signal.

14. The method of claim 13, further comprising:

performing, by a fast Fourier transformation (FFT) circuit, an FFT on each of the first operand and the second operand to generate each of first data and second data, and receiving, by an inverse fast Fourier transformation (IFFT) circuit, a result of the operation.

* * * * *